(12) United States Patent
Cruz

(10) Patent No.: US 10,283,955 B2
(45) Date of Patent: May 7, 2019

(54) CIRCUIT BREAKER WITH CURRENT MONITORING

(71) Applicant: Q Factory 33 LLC, Encinitas, CA (US)

(72) Inventor: Paul Martin Cruz, San Diego, CA (US)

(73) Assignee: QFE 002 LLC, Encinitas, CA (US)

( * ) Notice: Subject to any disclaimer, the term of this patent is extended or adjusted under 35 U.S.C. 154(b) by 502 days.

(21) Appl. No.: 14/984,622

(22) Filed: Dec. 30, 2015

(65) Prior Publication Data

US 2016/0211658 A1    Jul. 21, 2016

Related U.S. Application Data

(60) Provisional application No. 62/124,773, filed on Jan. 2, 2015.

(51) Int. Cl.
*H01R 4/42* (2006.01)
*H01R 9/24* (2006.01)
(Continued)

(52) U.S. Cl.
CPC .............. *H02H 3/08* (2013.01); *H01R 4/2404* (2013.01); *H01R 4/42* (2013.01); *H01R 13/622* (2013.01);
(Continued)

(58) Field of Classification Search
CPC ...... H01R 4/2404; H01R 4/42; H01R 4/2408; H01R 13/622; H01R 13/631; H01R 13/701; H01R 9/245; H01R 2103/00; H02B 1/04; H02B 1/20; H02B 1/03; H02H 3/08; H02S 40/34; H02G 5/02; H02J 3/383; Y02E 10/563
(Continued)

(56) References Cited

U.S. PATENT DOCUMENTS 3,697,809 A * 10/1972 Self ...................... H02H 11/001
361/47
5,206,777 A    4/1993 Clarey
(Continued)

FOREIGN PATENT DOCUMENTS

CN    201532450 U  *  7/2010
JP    2002-095169 A    3/2002

OTHER PUBLICATIONS

Machine Translation of Zhao et al Chinese Patent Document CN 201532450 U.*
(Continued)

*Primary Examiner* — Kevin J Comber
(74) *Attorney, Agent, or Firm* — Knobbe, Martens, Olson & Bear, LLP

(57) ABSTRACT

This disclosure provides systems, methods, and apparatuses for current monitoring. For example, in a system that includes a first circuit breaker coupled to a primary power source and a second circuit breaker coupled to an alternative power source, there is provided an apparatus that includes a controller circuit configured to prevent back-feeding of power from the alternative power source to the primary power source via tripping the second circuit breaker, in response to the total current in the first and second circuit breakers exceeding a defined maximum level.

17 Claims, 11 Drawing Sheets

(51) Int. Cl.
| | |
|---|---|
| *H02B 1/03* | (2006.01) |
| *H02B 1/04* | (2006.01) |
| *H02B 1/20* | (2006.01) |
| *H02G 5/02* | (2006.01) |
| *H02H 3/08* | (2006.01) |
| *H02J 3/38* | (2006.01) |
| *H01R 13/70* | (2006.01) |
| *H02S 40/34* | (2014.01) |
| *H01R 103/00* | (2006.01) |
| *H01R 13/622* | (2006.01) |
| *H01R 13/631* | (2006.01) |
| *H01R 4/2404* | (2018.01) |
| *H01R 4/2408* | (2018.01) |

(52) U.S. Cl.
CPC ............ *H01R 13/631* (2013.01); *H02B 1/04* (2013.01); *H02B 1/20* (2013.01); *H02G 5/02* (2013.01); *H02J 3/383* (2013.01); *H02S 40/34* (2014.12); *H01R 4/2408* (2013.01); *H01R 9/245* (2013.01); *H01R 13/701* (2013.01); *H01R 2103/00* (2013.01); *H02B 1/03* (2013.01); *Y02E 10/563* (2013.01)

(58) Field of Classification Search
USPC ........................................................ 361/93.5
See application file for complete search history.

(56) References Cited

U.S. PATENT DOCUMENTS

| | | | |
|---|---|---|---|
| 5,388,022 A * | 2/1995 | Ahuja | ...................... H02H 3/06 361/111 |
| 6,411,078 B1 * | 6/2002 | Nakagawa | ........... G01R 15/183 324/117 H |
| 7,824,191 B1 | 11/2010 | Browder | |
| 7,977,818 B1 | 7/2011 | Wahl | |
| 8,350,417 B1 | 1/2013 | Dooley | |
| 8,598,445 B2 | 12/2013 | Schroeder | |
| 8,700,224 B2 | 4/2014 | Mathiowetz | |
| 2002/0057146 A1 | 5/2002 | McMillan et al. | |
| 2002/0067628 A1 | 6/2002 | Takehara et al. | |
| 2009/0128348 A1 * | 5/2009 | Hsu | .................... H01R 13/6666 340/664 |
| 2011/0241426 A1 | 10/2011 | Wahl | |
| 2012/0281444 A1 | 11/2012 | Dent | |
| 2015/0333491 A1 | 11/2015 | Cruz | |
| 2016/0141846 A1 | 5/2016 | Atchley | |

OTHER PUBLICATIONS

Terri Steele, "The Unsung Hero of Solar Power International," Nov. 1, 2014: http://theecoreport.com/the-unsung-hero-of-solar-power-international/.
International Search Report and Written Opinion issued in PCT/US2014/38492 dated Sep. 22, 2014.
International Search Report and Written Opinion issued in PCT/2014/0053448 dated Dec. 18, 2014.

* cited by examiner

With the Dead front on

Without the Dead front on

US 10,283,955 B2

CIRCUIT BREAKER WITH CURRENT MONITORING

CROSS-REFERENCE TO RELATED APPLICATION

This application claims priority under 35 U.S.C. § 119(e) to U.S. Provisional Application No. 62/124,773, filed Jan. 2, 2015, which is hereby expressly incorporated by reference herein.

FIELD

The present invention relates generally to circuit breakers. More specifically, the disclosure is directed to an alternative energy circuit breaker configured to monitor current from both a primary power source and an alternative power source.

BACKGROUND

If a homeowner decides to invest in an alternative energy system (e.g., solar, wind, or gas generator power) with the goal of back-feeding energy to a utility, one must be mindful of the total amperage passing through the bus-bar to comply with energy codes and regulations (e.g., the 120% Rule) and to avoid fire hazards.

It is noted that an energy system may include a primary power source to/from the utility, as well as the alternative power source (e.g., from a rooftop-installed solar and/or inverter). Both the primary power source and the alternative power source may be coupled to the bus-bar. Existing current monitoring systems may not account for the additional amperage passing through the bus-bar.

In this context, there remains a need a current monitoring system that monitors current levels and prevents overcurrent conditions in the energy system, while minimizing disruption of energy service to the homeowner.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a device for providing overcurrent protection in a system that includes a primary power source and an alternative power source (e.g., rooftop-installed solar panels). A first circuit breaker may be coupled to the primary power source, and a second circuit breaker may be coupled to the alternative power source. The device may include: a first set of probes coupled to the primary power source and comprising first conductors carrying a first current from the primary power source; and a second set of probes coupled to the alternative power source and comprising second conductors carrying a second current from the alternative power source. The device may further include a current monitoring circuit and a controller circuit.

In related aspects, the current monitoring system may include: first and second contacts coupled to the first conductors and the second conductors; and at least one current sensor in between the first and second contacts and configured to measure the first and second currents.

In further related aspects, the controller circuit may be coupled to the current monitoring circuit and configured to prevent back-feeding of power from the alternative power source to the primary power source via tripping the second circuit breaker, in response to a total of the first and second currents exceeding a defined maximum level.

Another aspect of the present disclosure provides an apparatus for preventing excess current levels in a system that includes a first circuit breaker coupled to a primary power source and a second circuit breaker coupled to an alternative power source. The apparatus may include: means for receiving a first current from the primary power source; means for receiving a second current from the alternative power source; means for monitoring a total of the first current and the second current; and means for preventing back-feeding of power from the alternative power source to the primary power source via tripping the second circuit breaker in response to the total of the first and second currents exceeding a defined maximum level.

Figure 1A:
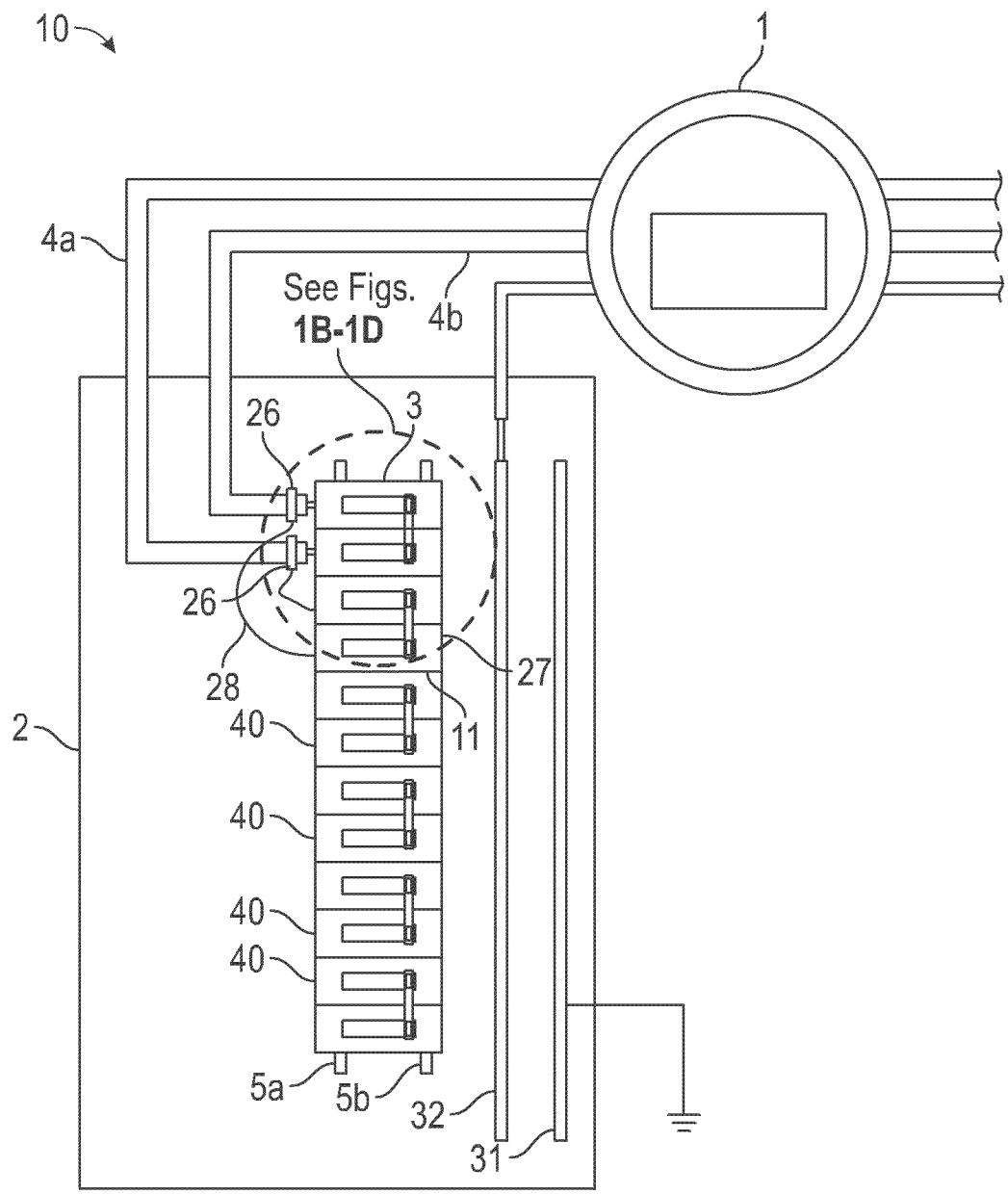
FIG. 1A a schematic diagram of a portion of an example current monitoring system that includes two-phase circuit breakers, in accordance with aspects of the present disclosure.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Devices and techniques are described for connecting an alternative energy source (e.g., solar, wind, or gas generator power) to power source lines of a utility company to back-feed power to the utility company at a circuit breaker panel. In some implementations, an over current protection device (OCPD) is electrically coupled to the source lines before the source lines are coupled to the main circuit breaker such that it can pass current from the alternative energy source to the source lines without using the bus-bars of the circuit breaker panel. In some implementations, the OCPD includes slots that are configured to receive the source lines when the OCPD is pushed down over the source lines. The OCPD also includes coupling structures that fit around at least a portion of the source lines, and may include one or more spike taps or the like to electrically couple to the source lines.

In accordance with one or more aspects of the present disclosure, there is provided an alternative energy circuit breaker coupled to an alternative energy source, in addition to a main circuit breaker coupled to a primary energy source. The flow of electricity in the main power cables connected to the main circuit breaker may be monitored and, if excessive current is detected, the alternative energy circuit breaker (not the main circuit breaker) may be tripped or turned off. Embodiments of the alternative energy circuit breaker described herein may be connected to a bus-bar, but render an electric/circuit breaker panel that is safer than conventional approaches because a current that meets or exceeds the threshold value (e.g., representing the maximum amperage allowed in accordance with the 120% rule), trips the alternative energy circuit breaker that would otherwise exceed the maximum allowable amperage of the bus-bar.

In accordance with one or more aspects of the present disclosure, FIG. 1A illustrates an embodiment of a current monitoring system 10, which may include a live-load, snap-on, current sensor feature. The system 10 may include a main power source 4a (A phase) and a main power source 4b (B phase) that are connected to an electrical meter 1. The system 10 may include an electric panel 2 which may include, among other things, a bus-bar 5a (A phase) and a bus-bar 5b (B phase). The electric panel 2 may include a grounding bar 31 and a neutral bus-bar 32 (also known as a common, negative, and return wire) coupled to the electrical meter 1.

The panel 2 may include a plurality of two-pole 240 VAC breakers 40 over the bus-bars 5a and 5b. It is noted that the embodiment of FIG. 1A, as well as one or more of the other embodiments described herein, do not bypass the bus-bars 5a and 5b. The main power sources 4a and 4b may be coupled to the bus-bars 5a and 5b via a main circuit breaker 3.

Figure 1B:
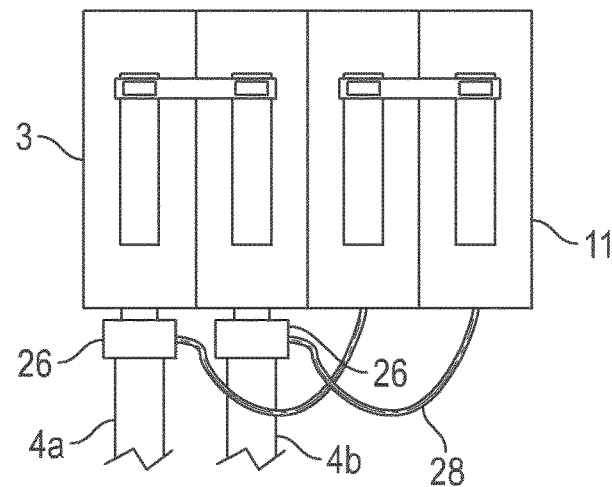
FIGS. 1B-1D illustrate further details of the example current monitoring system of FIG. 1A.
Figure 1C:
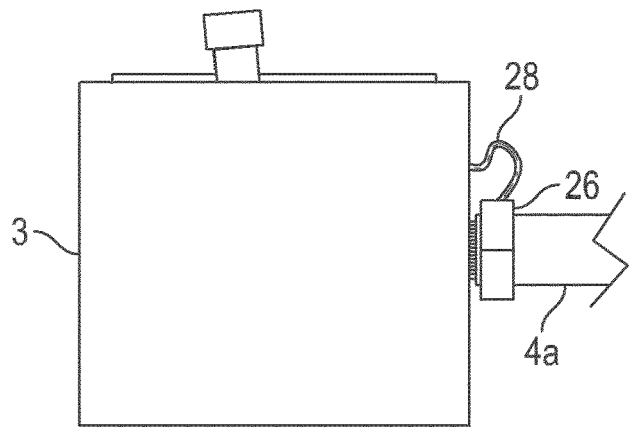
Figure 1D:
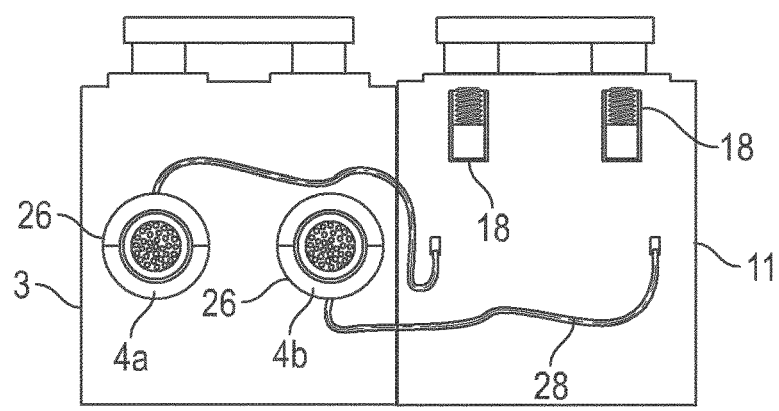

The bus-bars 5a and 5b may be used to transfer energy from an alternative power source (see FIG. 1D). The alternative power source may be coupled to the bus-bars 5a and 5b via an alternative energy OCPD 11. For example, the alternative energy OCPD 11 may be an alternative energy circuit breaker 27, which may be a standard two-pole breaker or the like. In related aspects, the OCPD 11 may be installed in the system 10 without turning the power off.

Each of the circuit breakers 3, 27, and 40 may be or include any suitable electrical switch designed to protect an electrical circuit from damage caused by an overload or short circuit, and may interrupt current flow in response to detecting a fault condition.

In the embodiment of FIG. 1A, there are shown snap-on current sensing relays that comprise snap-on current monitoring probes 26 and monitoring wires or leads 28. The current monitoring probes 26 may be placed on the main power sources 4a and 4b. The probes 26 may be coupled to the alternative energy circuit breaker 27 via conductors, such as, for example, the monitoring wires 28. This way, the amperage of both the main circuit breaker 3 and the alternative energy circuit breaker 27 may be monitored, for example, at the alternative energy circuit breaker 27. If the total amperage exceeds the bus-bar rating by a defined amount, then the alternative energy circuit breaker 27 will trip.

It is noted that the alternative energy circuit breaker 27 may be configured to be fail safe; for example, if the monitoring wire 28 breaks or becomes disconnected, such that there is no signal from the monitoring probes 26, then the alternative energy circuit breaker 27 of the OCPD 11 will trip or be shut off, leaving the power flowing normally though the main circuit breaker 3.

The total amperage of the circuit breakers 3 and 27 may be monitored in numerous ways. For example, the total amperage may be monitored electronically via thermal electric and/or electromagnetic sensors (and/or transducers). In another example, the total amperage may be monitored mechanically via mechanical magnetic and/or thermal mechanical sensors (and/or transducers). In still another example, the total amperage may be monitored based on heat breaking down magnetics, via thermal electric and/or electromagnetic sensors (and/or transducers).

Any suitable sensor and/or transducer, which may be collectively referred to herein as sensor(s), may be used to monitor the total amperage of the circuit breakers 3 and 27. For example, the sensor(s) may include: (i) a Hall effect integrated circuit (IC) sensor; (ii) a transfer or current clamp meter (suitable for AC current only); (iii) a fluxgate transformer (suitable for AC and/or DC current); (iv) a resistor associated with a voltage that is directly proportional to the current through the resistor; (v) a fiber-optic sensor that uses an interferometer to measure the phase change in light caused by a magnetic field; and/or (vi) a Rogowski coil or device measuring AC or high speed current pulses.

FIGS. 1B-1D illustrate further details regarding FIG. 1A. FIG. 1B is a top view of the main circuit breaker 3 and the OCPD 11, along with the snap-on monitoring probes 26 on the main power sources 4a and 4b, as well as the monitoring wires 28 that extend from the monitoring probes 26 to the two-pole breaker 27 of the OCPD 11. FIG. 1C is a side view of the main circuit breaker 3 and the OCPD 11. FIG. 1D is a front view of the main circuit breaker 3 and the OCPD 11, which shows the power-in 18 from the alternative energy source.

Figure 2A:
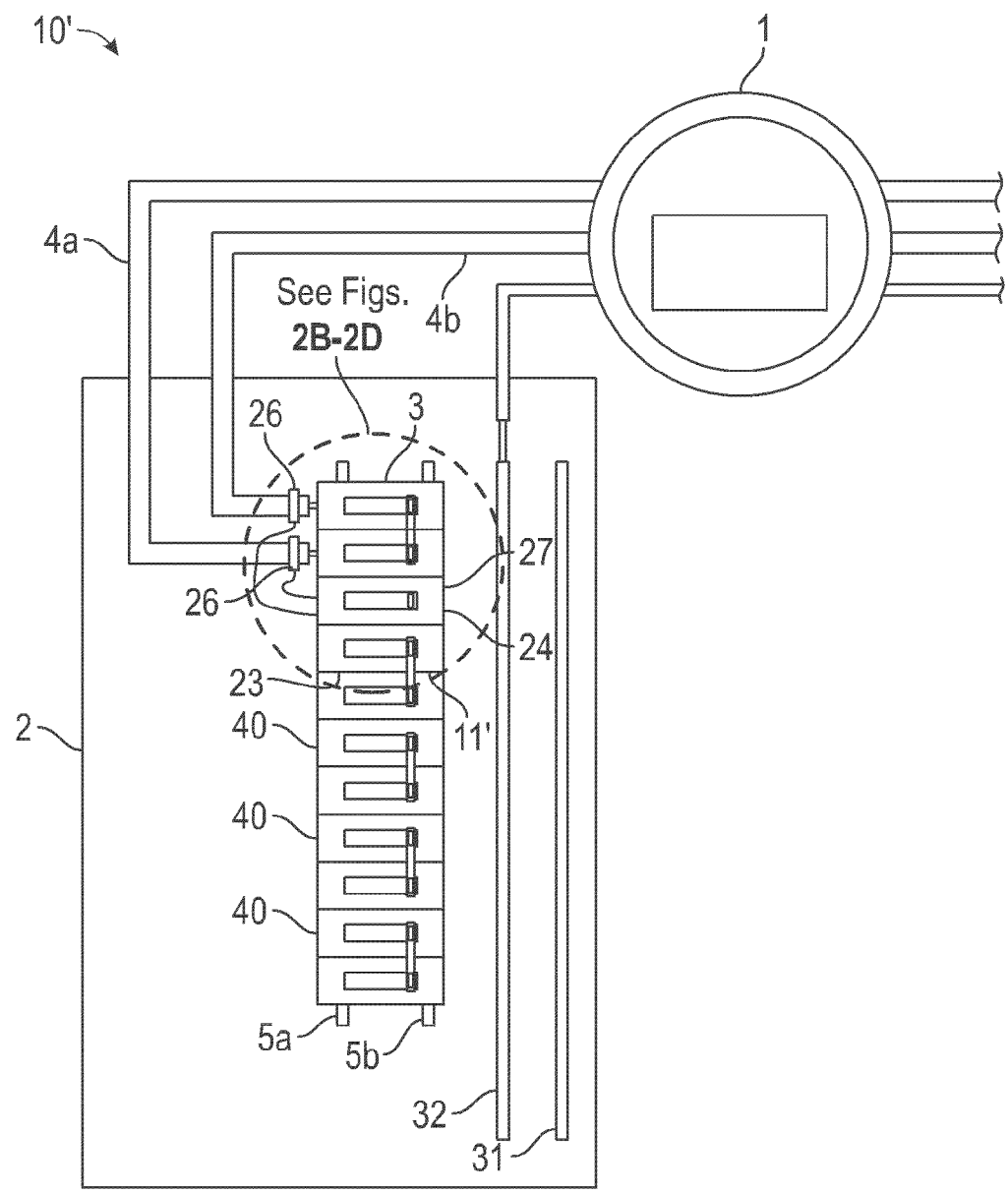
FIG. 2A a schematic diagram of a portion of another example current monitoring system, in accordance with aspects of the present disclosure.

With reference to FIG. 2A, there is shown a system 10' that is the same as the system 10 of FIG. 1A, except that the alternative energy OCPD 11' of the system 10' comprises an alternative energy circuit breaker 23 that is a twin breaker using only one breaker space for a two-pole breaker. The twin breaker 23 may be used, for example, when the circuit breaker panel has limited space. For the sake of conciseness, the rest of the details regarding the system 10' are not further elaborated on; however, it is to be understood that the remaining features and aspects of the system 10' are substantially similar to those described above with respect to the system 10 of FIG. 1A.

Figure 2B:
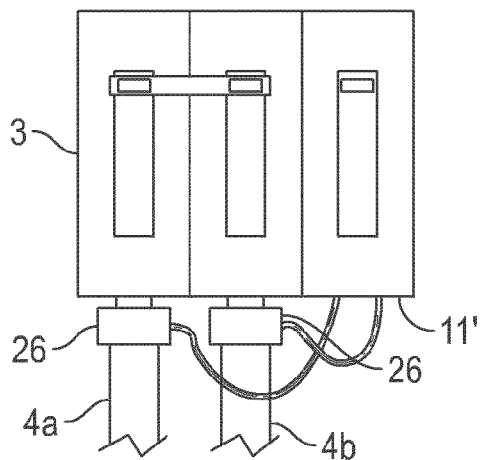
FIGS. 2B-2D illustrate further details of the example current monitoring system of FIG. 2A.
Figure 2C:
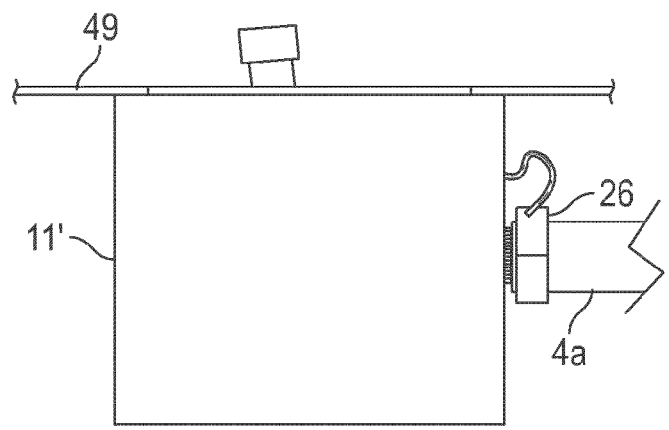
Figure 2D:
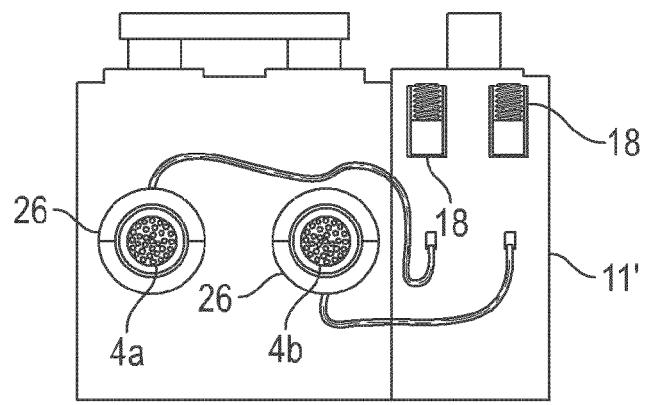

FIGS. 2B-2D illustrate further details regarding FIG. 2A. FIG. 2B is a top view of the main circuit breaker 3 and the OCPD 11', along with the snap-on monitoring probes 26 on the main power sources 4a and 4b, as well as the monitoring wires 28 that extend from the monitoring probes 26 to the twin breaker 23 of the OCPD 11'. FIG. 2C is a side view of the main circuit breaker 3 and the OCPD 11' (with the dead front on). FIG. 2D is a front view of the main circuit breaker 3 and the OCPD 11' (without the dead front on), which shows an example power-in 18 from the alternative energy source.

Figure 3A:
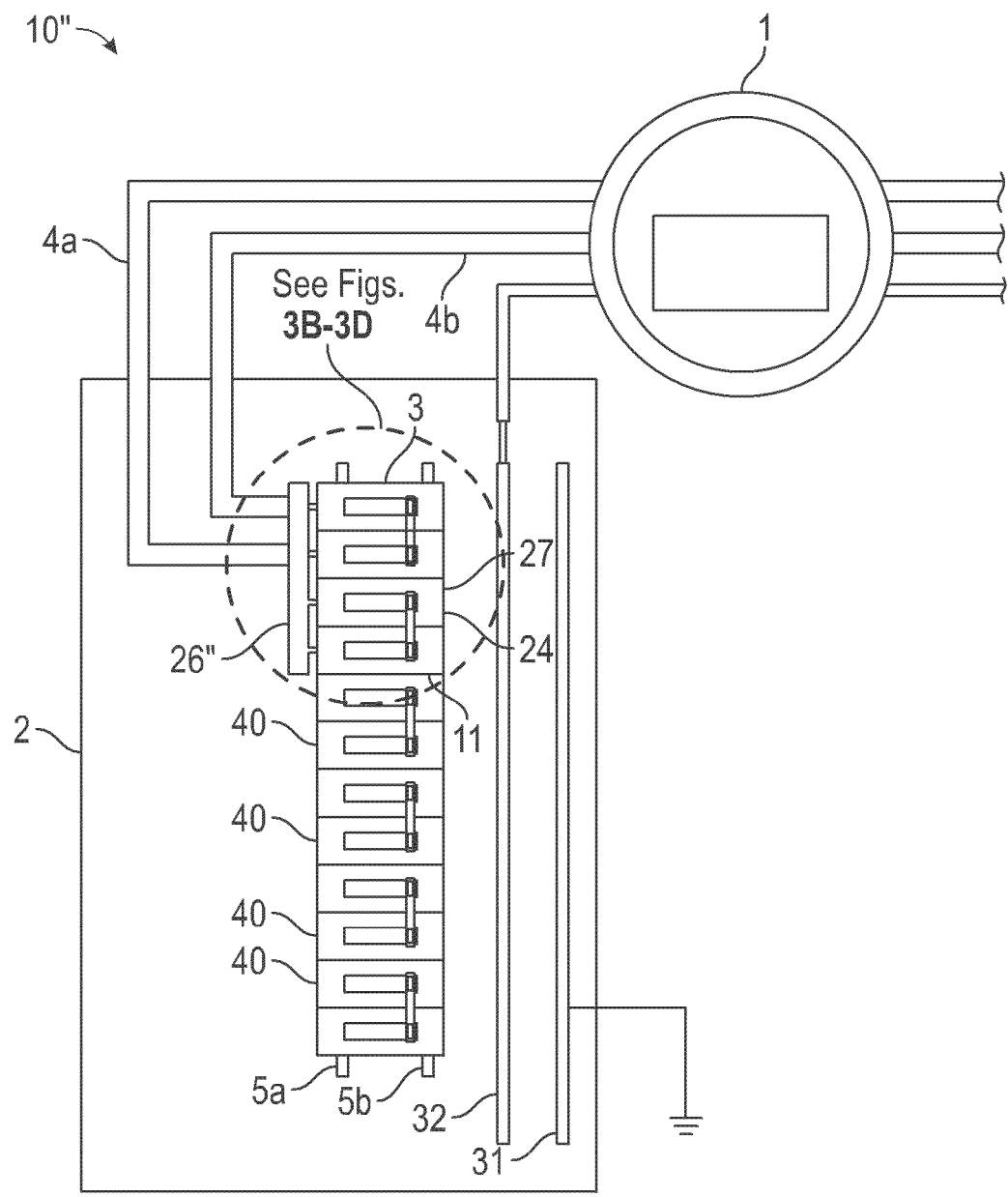
FIG. 3A a schematic diagram of a portion of yet another example current monitoring system, in accordance with aspects of the present disclosure.

With reference to FIG. 3A, there is shown a system 10" that is the same as the system 10 of FIG. 1, except that the system 10" includes bolt-on current sensing relays that comprise bolt-on current monitoring probes 26" and the monitoring wires 28. For the sake of conciseness, the rest of the details regarding the system 10" are not further elaborated on; however, it is to be understood that the remaining features and aspects of the system 10" are substantially similar to those described above with respect to the system 10 of FIG. 1A.

Figure 3B:
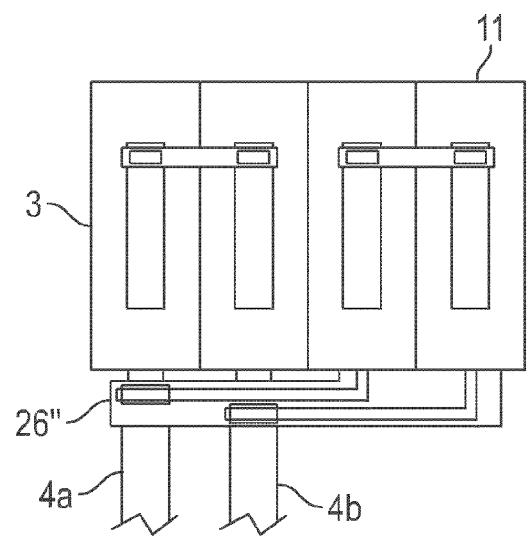
FIGS. 3B-3D illustrate further details of the example current monitoring system of FIG. 3A.
Figure 3C:
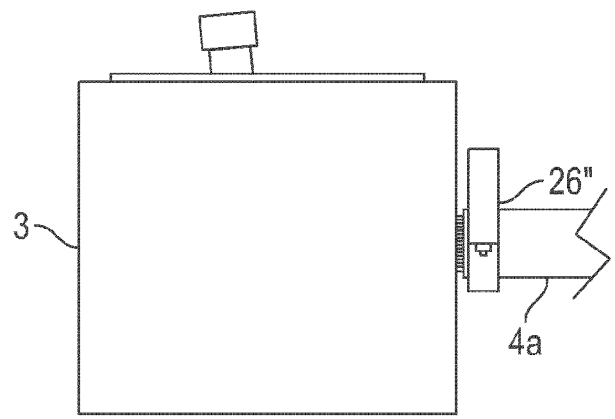
Figure 3D:
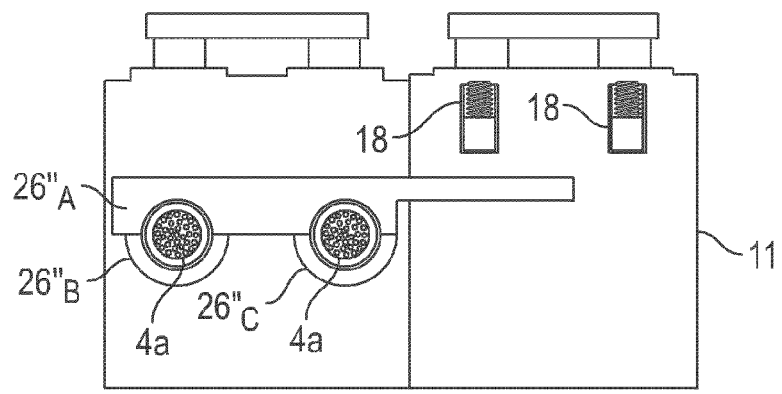

FIGS. 3B-3D illustrate further details regarding FIG. 3A. FIG. 3B is a top view of the main circuit breaker 3 and the OCPD 11, along with the bolt-on monitoring probes 26" on the main power sources 4a and 4b, as well as the monitoring wires 28 that extend from the monitoring probes 26" to the two-pole breaker 27 of the OCPD 11. FIG. 3C is a side view of the main circuit breaker 3 and the OCPD 11. FIG. 3D is a front view of the main circuit breaker 3 and the OCPD 11, which shows an example power-in 18 from the alternative energy source, as well as with the bolt-on monitoring probes 26" on the main power sources 4a and 4b. The monitoring probes 26" comprise a top portion $26_A"$, a bottom portion $26_B"$, and a bottom portion $26_C"$.

Figure 4A:
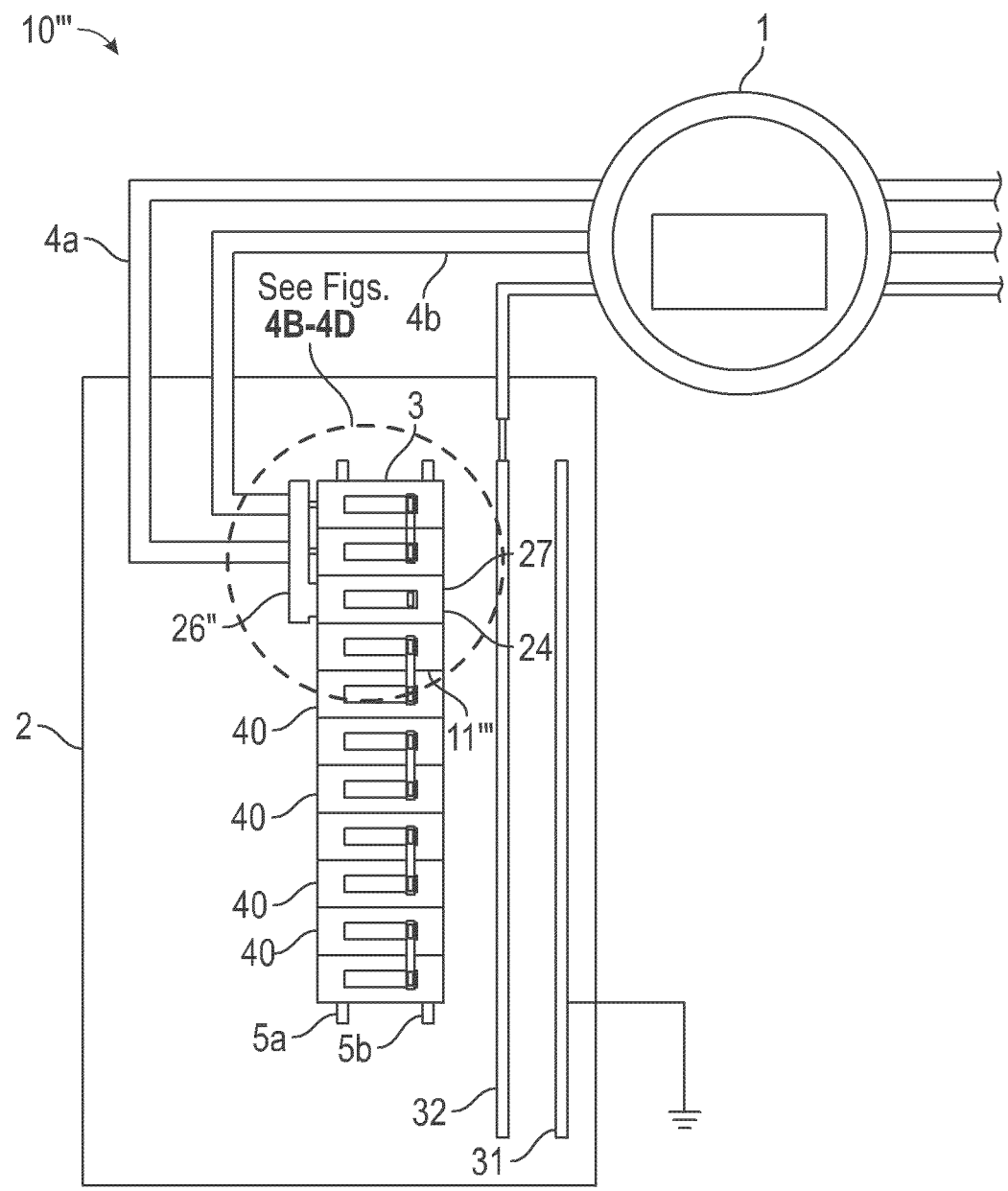
FIG. 4A a schematic diagram of a portion of still another example current monitoring system, in accordance with aspects of the present disclosure.

With reference to FIG. 4A, there is shown a system 10''' that is the same as the system 10" of FIG. 3, except that the alternative energy OCPD 11''' of the system 10''' comprises a twin breaker 23 that uses only one breaker space for a two-pole breaker. The twin breaker 23 may be used, for example, when the circuit breaker panel has limited space. For the sake of conciseness, the rest of the details regarding the system 10''' are not further elaborated on; however, it is to be understood that the remaining features and aspects of the system 10''' are substantially similar to those described above with respect to the system 10" of FIG. 3A.

Figure 4B:
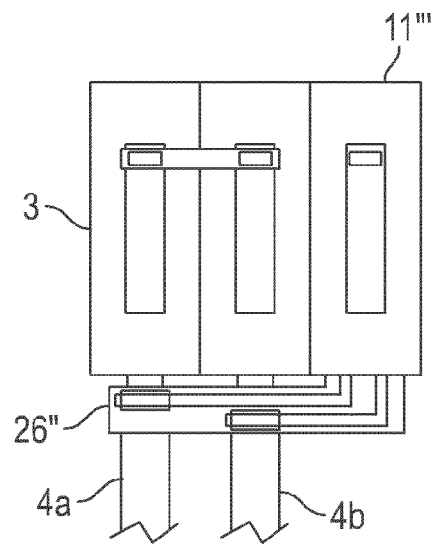
FIGS. 4B-4D illustrate further details of the example current monitoring system of FIG. 4A.
Figure 4C:
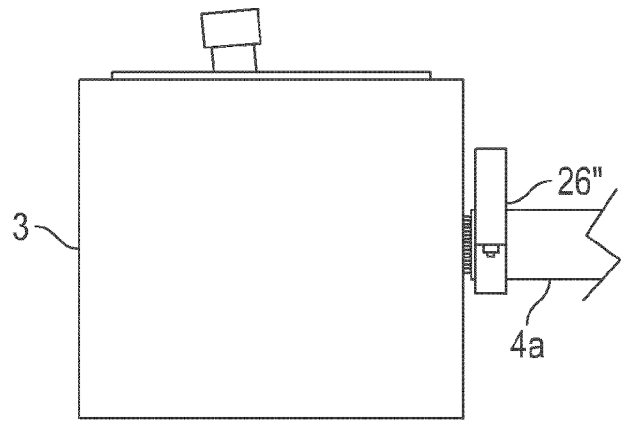
Figure 4D:
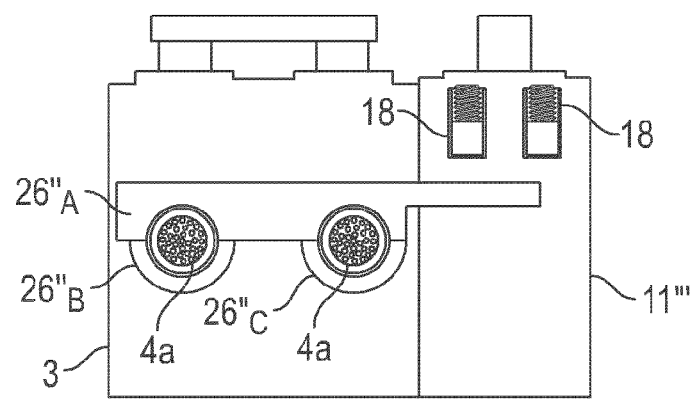

FIGS. 4B-4D illustrate further details regarding FIG. 4A. FIG. 4B is a top view of the main circuit breaker 3 and the OCPD 11''', along with the bolt-on monitoring probes 26''' on the main power sources 4a and 4b, as well as the monitoring wires 28 that extend from the monitoring probes 26" to the twin breaker 23 of the OCPD 11'''. FIG. 4C is a side view of the main circuit breaker 3 and the OCPD 11'''. FIG. 4D is a front view of the main circuit breaker 3 and the OCPD 11''', which shows an example power-in 18 from the alternative energy source, as well as with the bolt-on monitoring probes 26''' on the main power sources 4a and 4b. The monitoring probes 26''' comprise a top portion $26_A'''$, a bottom portion $26_B'''$, and a bottom portion $26_C'''$.

The exemplary embodiments in FIGS. 1A-1D, 2A-2D, 3A-3D, and 4A-4D show systems that may be used in two-phase applications (e.g., with the main power sources 4a and 4b). It is noted that the above described systems and/or component(s) thereof may be configured to be used in a three-phase application, such as, for example with main power source 4a (A phase), main power source 4b (B phase), and main power source 4c (C phase), as shown in the embodiments of FIGS. 5A-F.

Figure 5A:
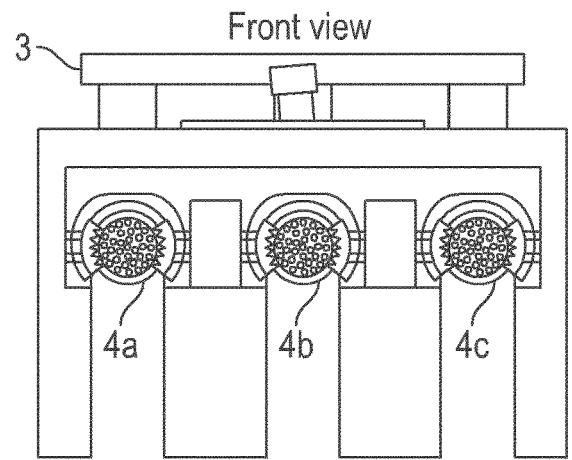
FIGS. 5A-E provide various views of examples of three-phase circuit breakers.
Figure 5B:
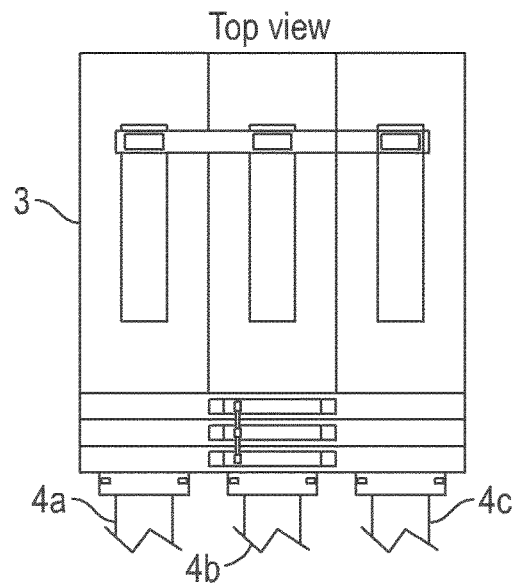
Figure 5C:
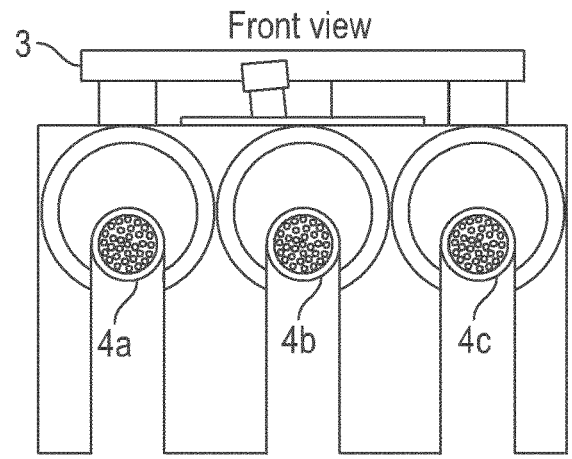
Figures 5D, 5E:
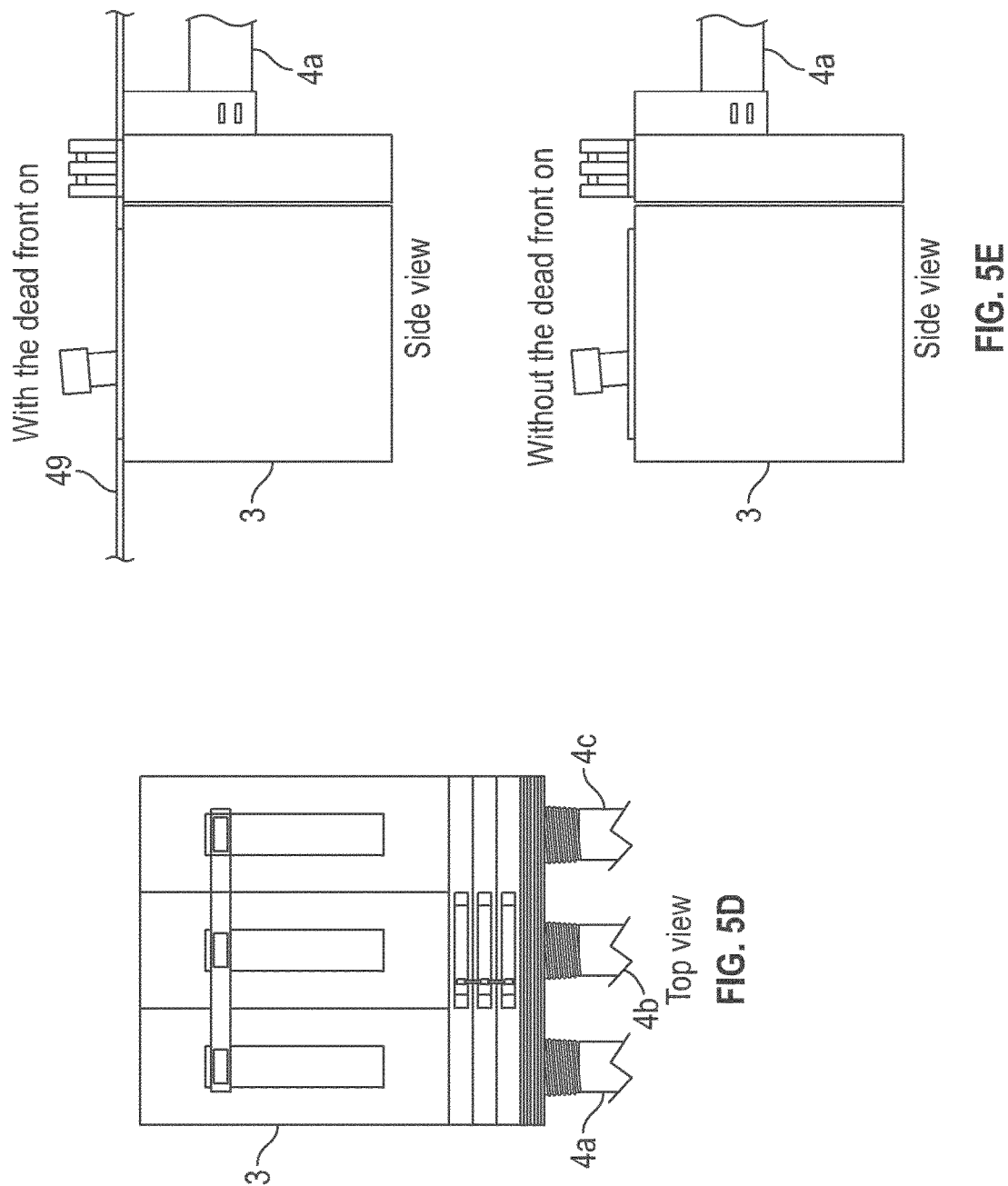

FIGS. 5A and 5B are front and top views, respectively, of one embodiment of a three-phase main circuit breaker 3 and the main power sources 4a, 4b, and 4c that are coupled to each other via a first type of coupling mechanism, wherein the first type of coupling mechanism includes a plurality of tapping spikes that are driven into the source lines of the main power sources 4a, 4b, and 4c. FIGS. 5C and 5D are front and top views, respectively, of another embodiment of the main circuit breaker 3 and the main power sources 4a, 4b, and 4c that are coupled to each other via a second type of coupling mechanism, wherein the second type of coupling mechanism includes at least one tapping spike (not shown, for each source line) that is driven into each of the source lines of the main power sources 4a, 4b, and 4c.

FIG. 5E is a side view of the main circuit breaker 3 with the dead front on. FIG. 5D is a side view of the main circuit breaker 3 without the dead front on.

Figure 6:
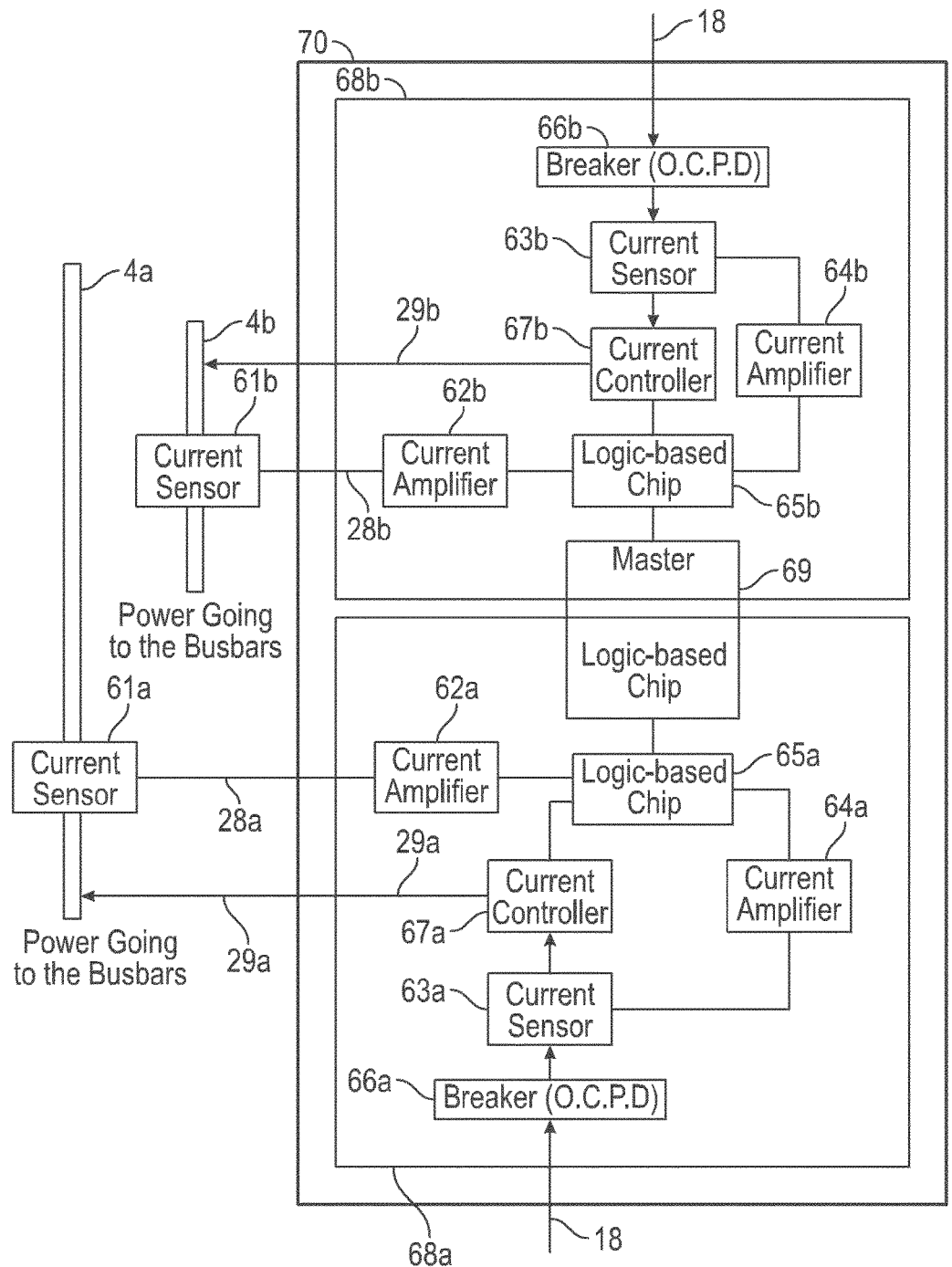
FIG. 6 is a block diagram of an example alternative energy circuit breaker, in accordance with aspects of the present disclosure.

In accordance with one or more aspects of the present disclosure, FIG. 6 illustrates an example alternative energy circuit breaker 70, which may be analogous to the alternative energy circuit breakers 23 and 27 described above. For a two-phase application, the alternative energy circuit breaker 70 may be coupled to the main power sources 4a and 4b as shown. It is noted that the alternative energy circuit breaker 70 may also be configured for use in a three-phase application (not shown). It is further noted the main power sources 4a and 4b as shown may provide power going to the bus-bars (e.g., the bus-bars 5a and 5b of FIG. 1A).

The alternative energy circuit breaker 70 may comprise a first breaker component 68a coupled to the main power source 4a, and a second breaker component 68b coupled to the main power source 4b. The first breaker component 68a corresponds to the A phase of the main power source—namely, the main power source 4a—which is a single pole of the two-pole breaker. The second breaker component 68b corresponds to the B phase of the main power source—namely, the main power source 4b—which is a single pole of the two-pole breaker.

The first breaker component 68a may be coupled to the main power source 4a via a current sensing relay. In the embodiment of FIG. 6, the current sensing relay may include a current sensor 61a coupled to a monitoring wire 28a that goes to the alternative energy circuit breaker 70, such that the current sensor 61a is located outside the alternative energy circuit breaker 70. In another embodiment, the current sensing relay may include the monitoring probe 26 coupled to the monitoring wire 28a that goes to the alternative energy circuit breaker 70, such that the current sensor 61a is located inside the alternative energy circuit breaker 70.

In related aspects, the current sensor 61a may comprise (i) a Hall effect sensor, (ii) a transfer or current clamp sensor, (iii) a fluxgate transformer type sensor, (iv) a resistor type sensor, (v) a fiber-optic current sensor, and/or (vi) a Rogowski coil sensor, for the A phase of the main power (e.g., the main power source 4a).

With continued reference to embodiment of FIG. 6, the first breaker component 68a may include a current amplifier 62a coupled to the monitoring wire 28a from the current sensor 61a. Energy collected from the current sensor 61a may not be strong enough to use as is. As such, the current amplifier 62a may be used to amplify the signal from the current sensor 61a.

In related aspects, in the embodiment of FIG. 6, the inputs to the current amplifiers 62a and 62b may be referred to herein as first contacts of a current monitoring system of the alternative energy circuit breaker 70. Similarly, the inputs to breaker/OCPD components 66a and 66b may be referred to herein as second contacts of the current monitoring system of the alternative energy circuit breaker 70.

The current amplifier 62a may be coupled to a logic-based chip 65a of the first breaker component 68a, and the logic-based chip 65a may be coupled to a master logic-based chip 69 of the alternative energy circuit breaker 70. The logic-based chip 6 may be coupled to other sub-components of the first breaker component 68a, including, for example, a current amplifier 64a, a current sensor 63a, a breaker/OCPD component 66a, and a current controller 67a.

The logic-based chip 65a may be configured to: receive the amplified signal from the current sensor 61a on the main panel power that feeds the bus-bars and the amplified signal from the current sensor 63a measuring the flow of current through the first breaker component 68a of the alternative energy circuit breaker 70; and determines a total current by combining the amplified signals from the current sensor 61a and the current sensor 63a. If the total current exceeds the a defined maximum level (e.g., the rating of the main breaker 3), then the logic-based chip 65a may terminate the power to both sides (the A phase and the B phase) of the alternative energy circuit breaker 70.

The energy circuit breaker 70 may further include a controller circuit, such as, for example, the logic-based chip 65a, the logic-based chip 65b, and/or the master logic-based chip 69. The master logic-based chip 69 may be configured to: (a) take information from (i) the logic-based chip 65a of the first breaker component 68a and/or (ii) the logic-based chip 65b of the second breaker component 68b, and (b) shut off both sides (the A phase and the B phase) of the alternative energy circuit breaker 70 when the total current (based on based on the combination of the amplified signals from the current sensor 61a and the current sensor 63a) exceeds a rating of the main breaker 3.

A power-in 18 from the alternative energy source may be coupled to the breaker/OCPD component 66a, which may comprise a typical circuit breaker. For example, the breaker/OCPD component 66a may be configured to, if the current goes past a rated breaker current value, trip and shut off all the power on the A phase and the B phase of the alternative energy circuit breaker 70.

The breaker/OCPD component 66a may be coupled to a current sensor 63a that is configured to measure the current from the first breaker component 68a going back to the bus-bar (A phase). The current sensor 63a may be the same type as the current sensor 61a.

The current sensor 63a may be coupled to the current amplifier 64 that is configured to amplify the signal from the current sensor 63a (i.e., the current signal from the breaker/OCPD component 66a and back-feeding the bus-bar (A phase).

The current controller 67a of the first breaker component 68a may be coupled to the logic-based chip 65a and the current sensor 63a. The current controller 67a may be configured to receive input signals from the logic-based chip 65a and/or the master logic-based chip 69. When the total current (based on the combination of the amplified signals from the current sensor 61a and the current sensor 63a) exceeds the bus-bar rating, the current controller 67a (based on the received input signals from the logic-based chip 65a and/or the master logic-based chip 69) may shut down the power from the alternative power source that would otherwise back-feed to the bus-bar via the back-feed wire or lead 29a (A phase).

With continued reference to the embodiment of FIG. 6, the second breaker component 68b is similar to the first breaker component 68a, except that the second breaker component 68b is coupled to the main power source 4b (the B phase) via the monitoring wire 28b and the back-feed wire or lead 29b.

The current sensing relay may include a current sensor 61b coupled to a monitoring wire 28b that goes to the alternative energy circuit breaker 70, such that the current sensor 61b is located outside the alternative energy circuit breaker 70. In another embodiment, the current sensing relay may include the monitoring probe 26 coupled to the monitoring wire 28b that goes to the alternative energy circuit breaker 70, such that the current sensor 61b is located inside the alternative energy circuit breaker 70.

The second breaker component 68b may include: a current amplifier 62b; the logic-based chip 65b; a current amplifier 64b, a current sensor 63b, a breaker/OCPD component 66b, and a current controller 67b. For the sake of conciseness, the rest of the details regarding the second breaker component 68b, and components thereof, are not further elaborated on; however, it is to be understood that the remaining features and aspects of the second breaker component 68b are substantially similar to those described above with respect to the first breaker component 68a.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A circuit breaker device for providing overcurrent protection in a system that includes a primary power source and an alternative power source, the primary power source coupled to a primary circuit breaker; the device coupled to the alternative power source and comprising:
    a first set of probes coupled to the primary power source and comprising first conductors carrying a first current from the primary power source, the first set of probes coupled to the primary power source between the primary power source and the primary circuit breaker;
    a second set of probes coupled to the alternative power source and comprising second conductors carrying a second current from the alternative power source;
    a current monitoring circuit comprising:
        first and second contacts coupled to the first conductors and the second conductors;
        at least one transducer coupled to the first and second contacts and configured to convert the first and second currents to at least one output signal; and
        a measuring component coupled to measure at least one signal value of the at least one output signal, the at least one measured signal value indicative of a total of the first and second currents; and
        at least one amplifier in between the first and second contacts and configured to amplify the at least one measured signal value;
    a controller circuit coupled to the current monitoring circuit and configured to prevent back-feeding of power from the alternative power source to the primary power source via tripping the circuit breaker device, in response to the amplified at least one measure signal value exceeding a defined maximum level that is indicative of an overcurrent condition of the system.

2. A device in a system that includes a first circuit breaker coupled to a primary power source and a second circuit breaker coupled to an alternative power source, the device comprising:
    a first set of probes coupled to the primary power source and comprising first conductors carrying a first current from the primary power source, the first set of probes coupled to the primary power source between the primary power source and the first circuit breaker;
    a second set of probes coupled to the alternative power source and comprising second conductors carrying a second current from the alternative power source;
    a current monitoring circuit comprising:
        first and second contacts coupled to the first conductors and the second conductors; and
        at least one current sensor coupled to the first and second contacts and configured to measure the first and second currents; and
    a controller circuit coupled to the first and second contacts and configured to prevent back-feeding of power from the alternative power source to the primary power source via tripping the second circuit breaker, in response to a total of the first and second currents exceeding a defined maximum level.

3. The device of claim 2, wherein the current monitoring circuit and the controller circuit of the device are located inside the second circuit breaker.

4. The device of claim 2, further comprising a power inverter coupled to the second conductors and configured to change at least one of the first and second currents into an alternating current (AC) signal.

5. The device of claim 2, wherein the alternative power source comprises at least one solar panel and at least one power inverter.

6. The device of claim 2, wherein the controller circuit comprises at least one micro-processor configured to trip the second circuit breaker in response to a measured signal value exceeding the defined maximum level.

7. The device of claim 2, wherein the controller circuit comprises an array of relays and reed switches configured to trip the second circuit breaker in response to a measured signal value exceeding the defined maximum level.

8. The device of claim 2, wherein the defined maximum level comprises 120% of a bus-bar rating of the first breaker.

9. The device of claim 2, further comprising at least one current amplifier coupled to the at least one sensor via the first and second contacts, the at least one amplifier configured to amplify at least one output of the least one current sensor.

10. The device of claim 2, wherein the at least one current sensor comprises:
    two or more magnets configured to generate a magnetic field; and
    a Hall effect sensor configured to vary its output voltage in response to a deflection of the magnetic field resulting from the first and second currents.

11. The device of claim 2, wherein:
    the first and second currents comprise AC signals; and
    the at least one current sensor comprises at least one of a current transformer, an iron vane, and a Rogowski coil.

12. The device of claim 2, wherein the at least one current sensor comprises:
two or more magnets configured to generate a magnetic field; and
a fluxgate transformer configured to vary its output in response to a deflection of the magnetic field resulting from the first and second currents.

13. The device of claim 2, wherein the at least one current sensor comprises a resistor with a voltage directly proportional to current through it.

14. The device of claim 2, wherein the at least one current sensor comprises:
two or more magnets configured to generate a magnetic field;
a light source configured to emit a light; and
an interferometer configured to measure a phase change in the light produced by the magnetic field resulting from the first and second currents.

15. An apparatus for preventing excess current levels in a system that includes a first circuit breaker coupled to a primary power source and a second circuit breaker coupled to an alternative power source, the apparatus comprising:
means for receiving a first current from the primary power source, the means for receiving a first current connected to the primary power source between the primary power source and the first circuit breaker;
means for receiving a second current from the alternative power source;
means for monitoring a total of the first current and the second current; and
means for preventing back-feeding of power from the alternative power source to the primary power source in response to a total of the first and second currents exceeding a defined maximum level.

16. The apparatus of claim 15, wherein the preventing means comprises means for tripping the second circuit breaker in response to the total of the first and second currents exceeding the defined maximum level.

17. The apparatus of claim 16, wherein the tripping means comprises at least one logic-based chip configured to trip the second circuit breaker in response to the total of the first and second currents exceeding 120% of a bus-bar rating of the first breaker.

* * * * *